United States Patent Office 3,510,697
Patented May 5, 1970

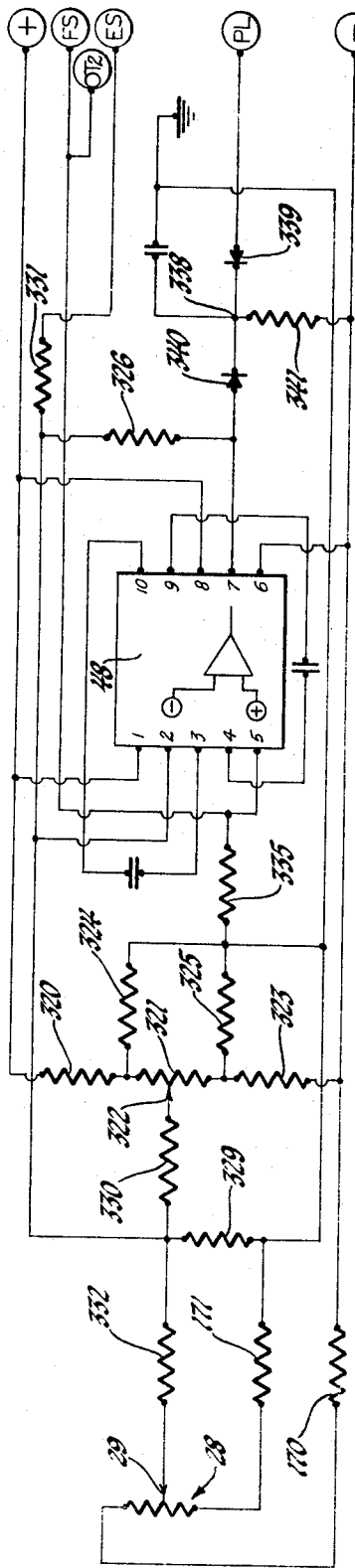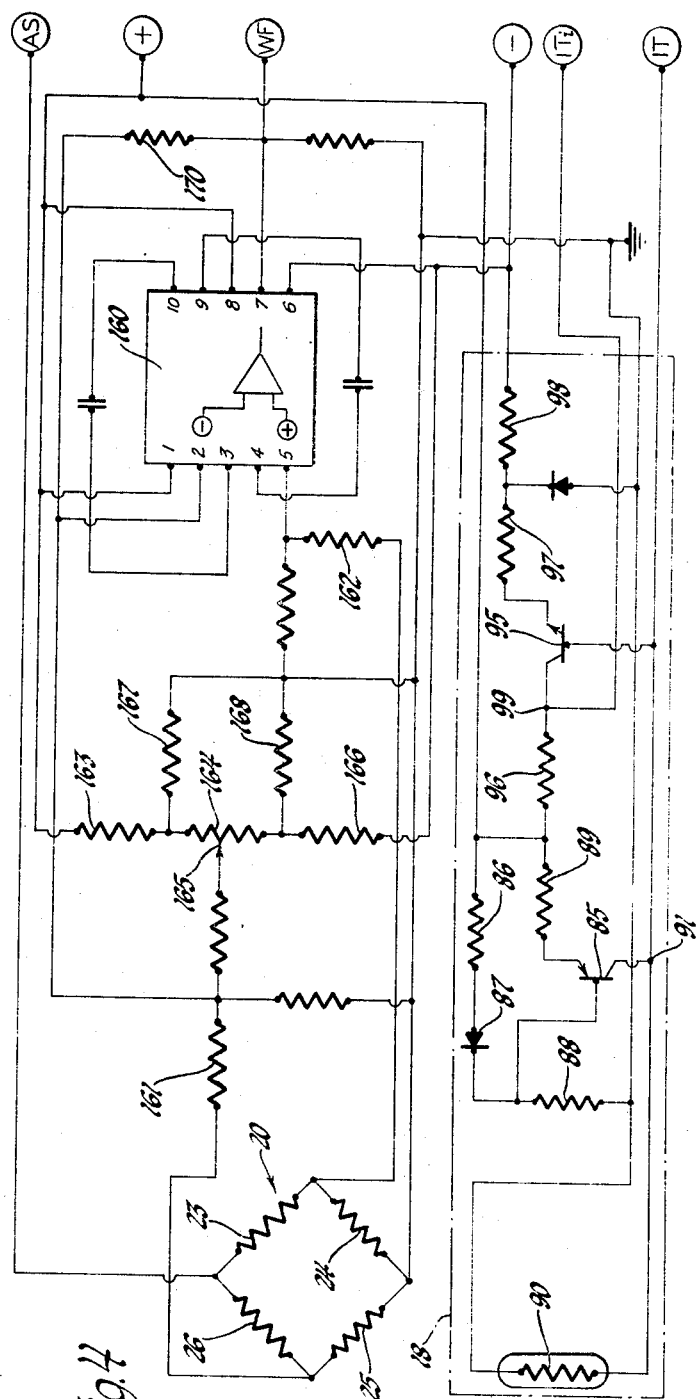
Fig. 3
Fig. 4
INVENTORS
Robert E. Nelson,
Russell D. Green &
Robert K. Sanders
BY
Richard G. Stahl
ATTORNEY

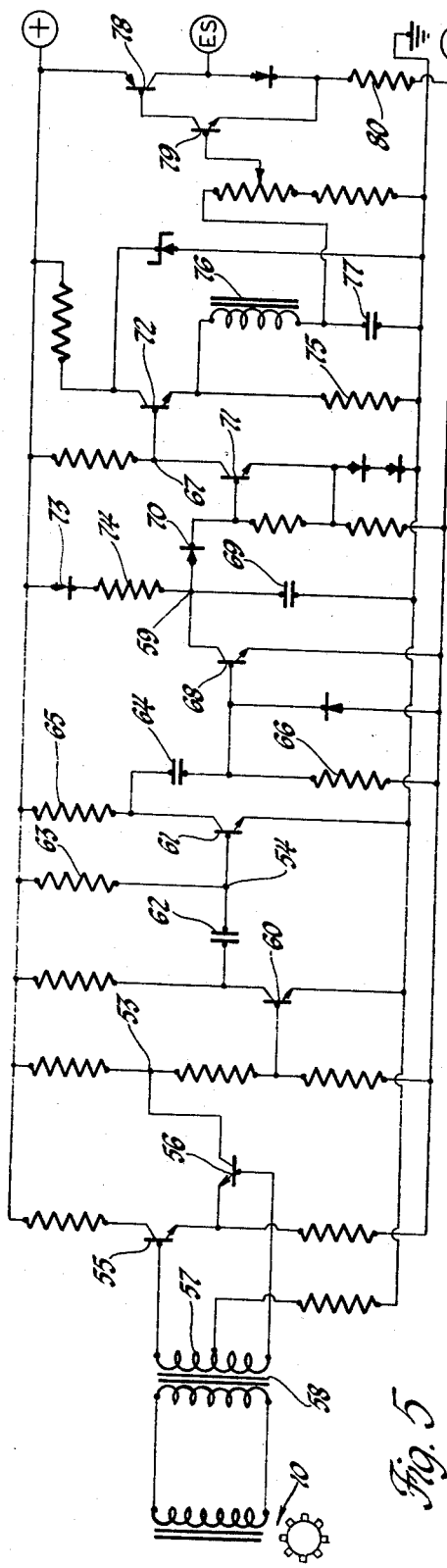

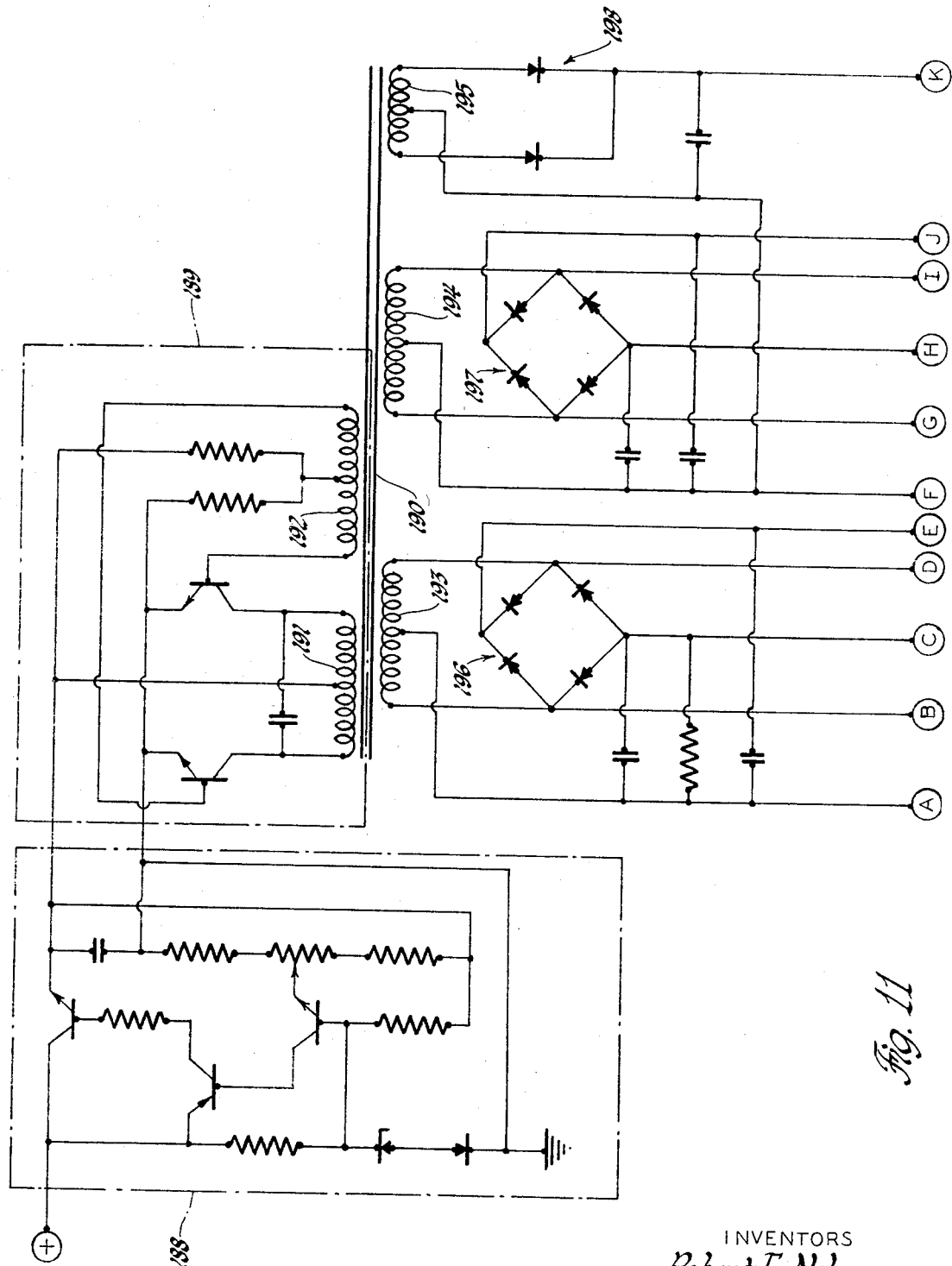

3,510,697
ELECTRONIC FUEL CONTROL SYSTEM
Robert E. Nelson and Russell D. Green, Indianapolis, and Robert K. Sanders, Whitestown, Ind., assignors to General Motors Corporation, Detroit, Mich., a corporation of Delaware
Original application Aug. 17, 1967, Ser. No. 661,342. Divided and this application Nov. 1, 1968, Ser. No. 772,615
Int. Cl. G01k 7/02
U.S. Cl. 307—308          2 Claims

ABSTRACT OF THE DISCLOSURE

The circuit of this invention operates to control the rate of fuel flow to jet type engines and is described with reference to a fan jet engine. Conventional magnetic type pick-up units of the type which produce substantially sinusoidal alternating current signals which increase in frequency within increases in speed are mounted upon the turbine shaft and the fan shaft. The alternating current signals produced by these magnetic pick-up units are converted into respective direct current signals which increase substantially linear in magnitude with increases in frequency by respective electronic converter circuits to produce a direct current engine speed signal and a direct current fan speed signal, respectively. Mounted in the compressor inlet air stream is a compressor inlet air temperature sensor, such as a thermistor device, which produces a direct current signal which is proportional to the compressor inlet air temperature. The direct current engine speed signal and the direct current compressor inlet air temperature signal are applied to an electronic acceleration schedule circuit comprising two operational amplifiers which produces an output potential wave form which substantially duplicates the characteristic acceleration schedule curve of the specific engine with which the fuel control system is being employed which corresponds to the existing ambient temperature. This potential wave form is multiplied by the compressor discharge pressure in a piezoelectric resistive element bridge circuit to produce a potential signal which electrically represents the weight of fuel required for any engine speed at the existing ambient temperature. This signal is applied to an electronic fuel driver circuit comprised of an operational amplifier which operates the fuel valve in a direction to supply the computed weight of fuel to the engine at any engine speed. For safety reasons, the fan speed signal and a turbine temperature signal produced by a thermocouple device mounted upon the turbine are employed to reduce the amount of fuel flow to the engine under conditions of over-speed or over-temperature.

---

This is a division of Ser. No. 661,342 filed Aug. 17, 1967.

The present invention relates to fuel control systems for jet type engines and, more specifically, to an electronic fuel control system for engines of this type.

With jet type engines, it is necessary that the fuel supplied thereto be compatible with the operating characteristics of the engine with which the fuel control system is being used. It is important that the fuel be supplied thereto in accordance with an acceleration schedule as determined by the operating characteristics of the engine with regard to conditions of engine speed, ambient temperature, engine compressor discharge pressure and the setting of the power lever.

Formerly, fuel control systems of this type were largely mechanical and hydraulic systems which require bulky and heavy mechanical equipment. As it is important to reduce all necessary weight, particularly in aircraft engines, to correspondingly increase the pay load, it is desirable to reduce as much as possible the bulk and weight of the fuel control system. For this reason, the electronic fuel control system of this invention has been developed.

It is an object of this invention to provide an improved fuel control system for use with jet type engines.

It is another object of this invention to provide an electronic fuel control system for jet type engines.

It is a further object of this invention to provide an improved electronic fuel control system for use with jet type engines which automatically supplies the proper amount of fuel thereto as required to comply with a predetermined acceleration schedule.

In accordance with this invention, an electronic fuel control system for jet type engines is provided wherein the proper amount of fuel is supplied to the engine in accordance with a predetermined characteristic schedule in response to conditions of engine speed, ambient temperature, engine compressor discharge pressure and power lever setting and includes protection features which operate to automatically reduce the amount of fuel supplied to the engine in response to conditions of over-temperature and/or over-speed.

Figures 1, 2:
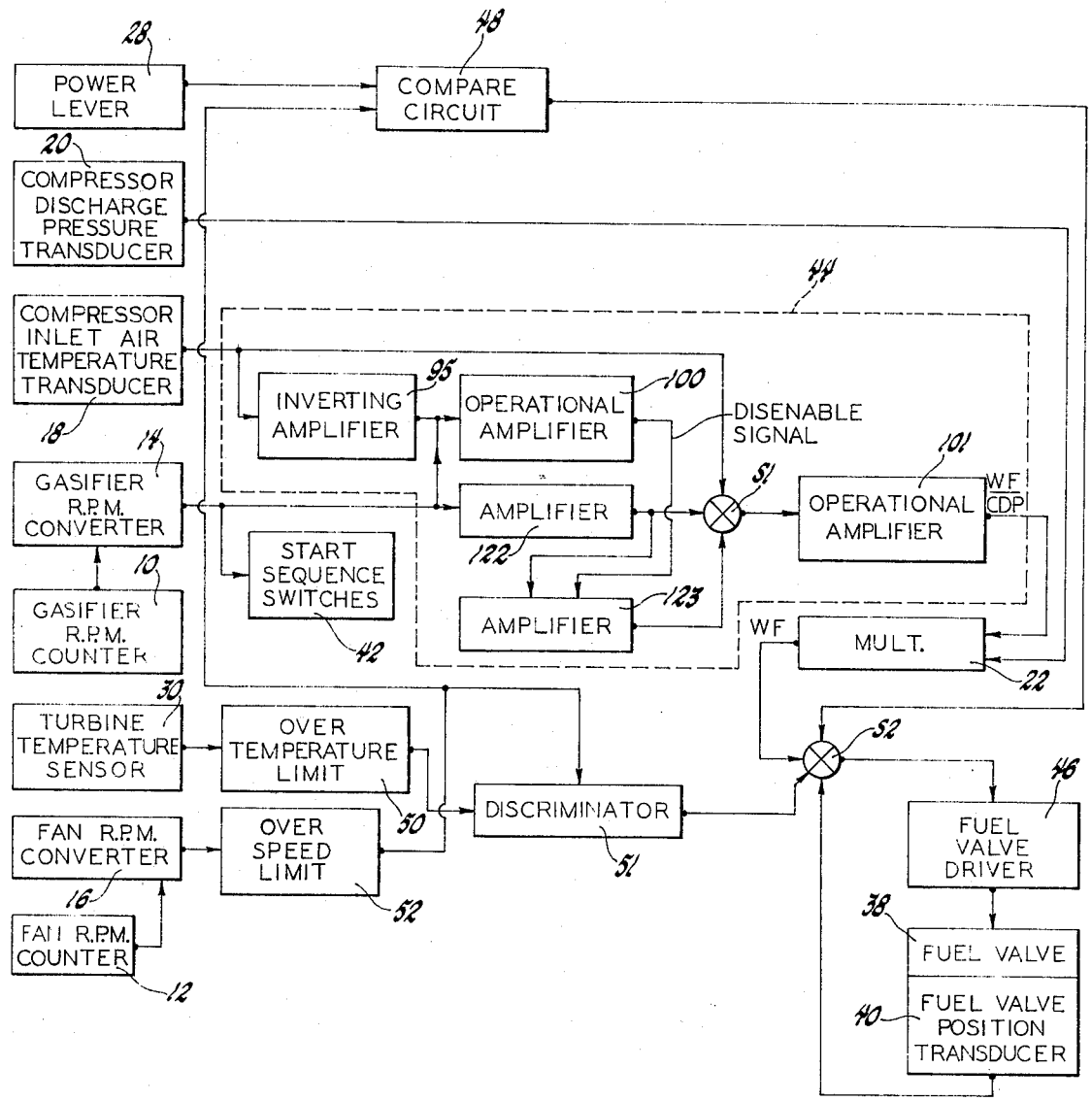
Figure 7:
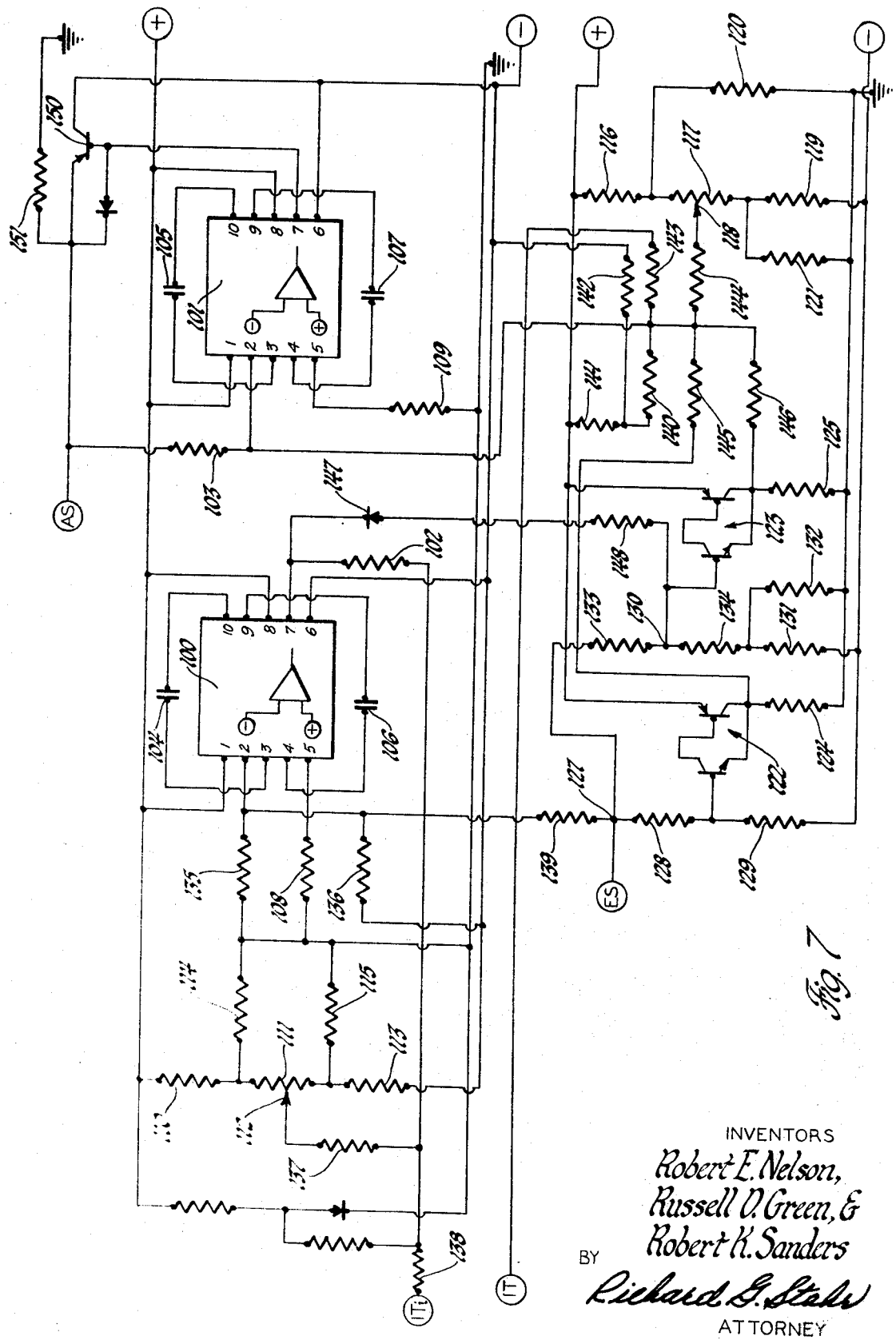
Figure 8:
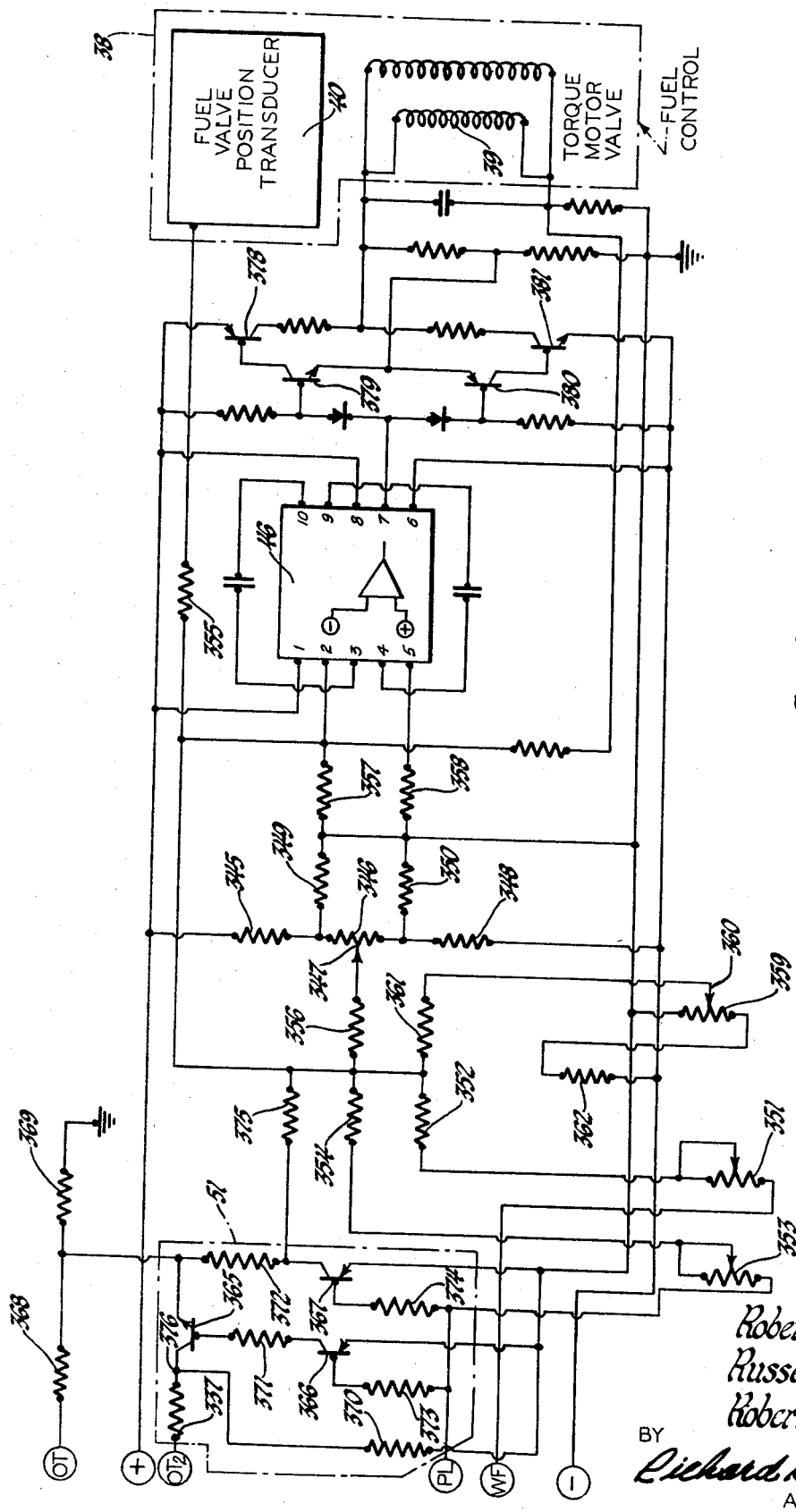
Figure 9:
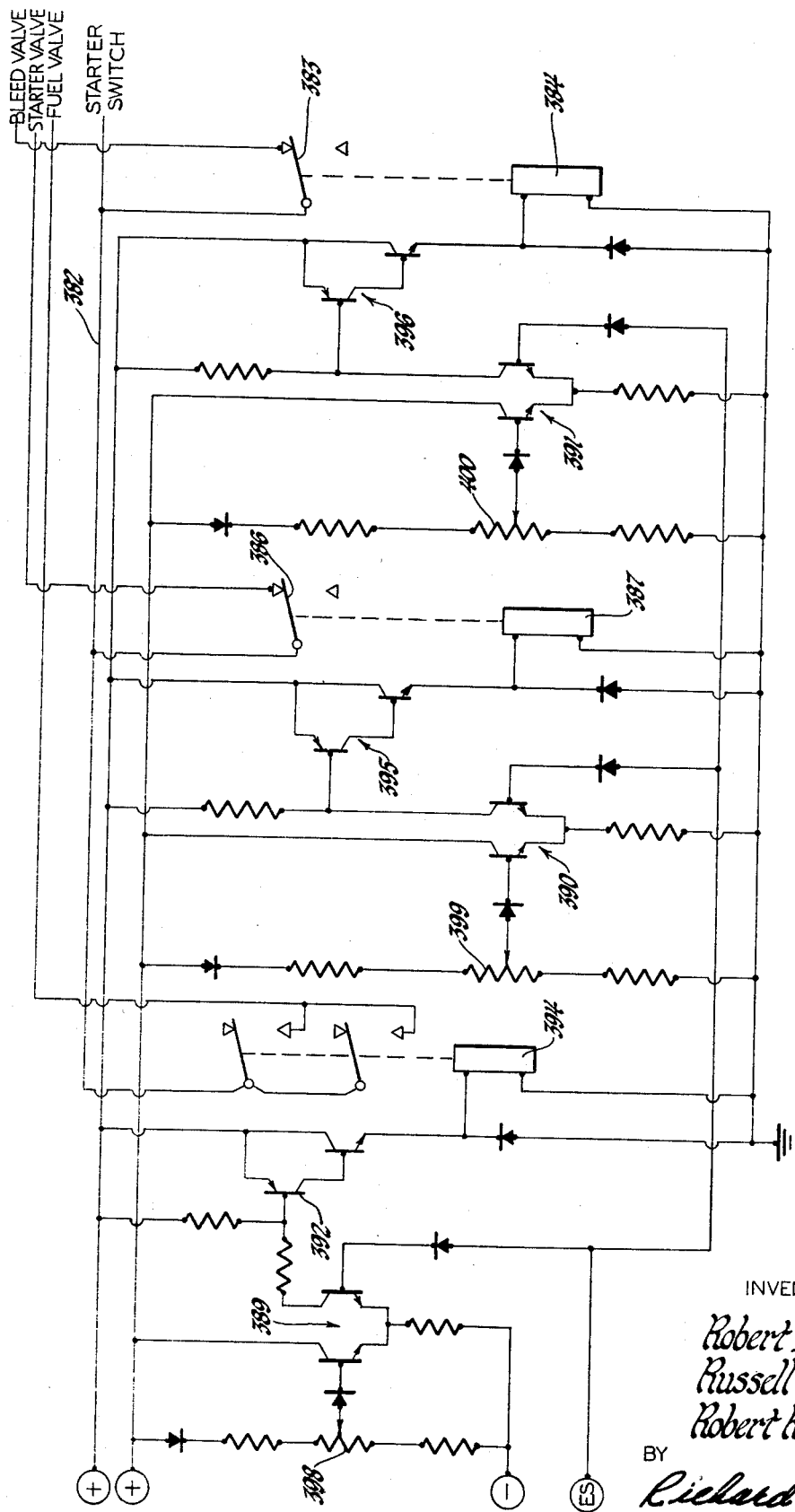
Figure 10:
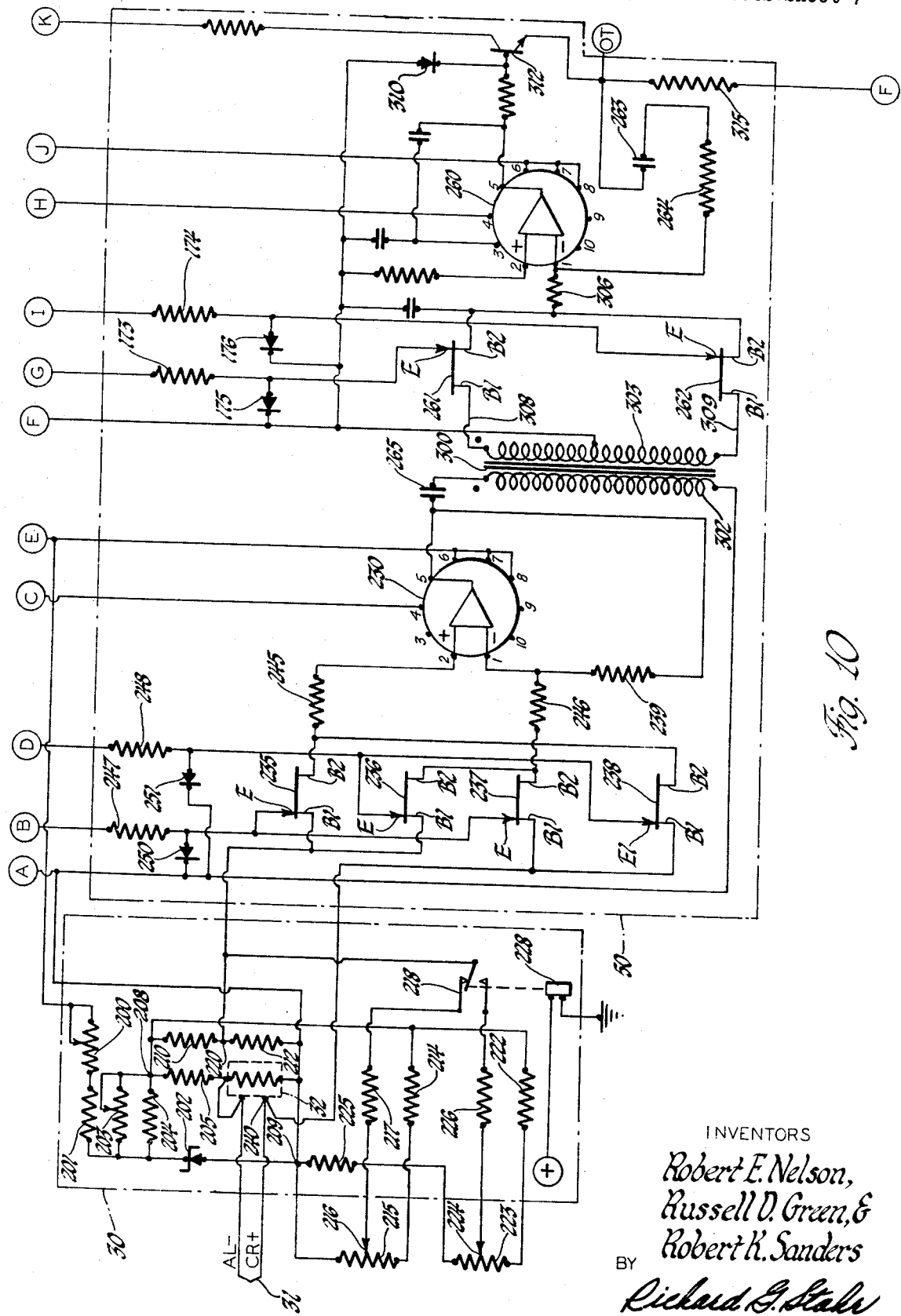

For a better understanding of the present invention, together with additional objects, advantages and features thereof, reference is made to the following description and accompanying drawings in which:

FIG. 1 sets forth the electronic fuel control system of this invention in block form, FIG. 2 is a family of characteristic weight of fuel/compressor discharge pressure vs. engine speed acceleration schedule curves, WF/CDP vs. r.p.m., each corresponding to a respective condition of ambient temperature, FIG. 3 sets forth the power lever and compare circuit circuitry in schematic form, FIG. 4 sets forth the compressor discharge pressure transducer and compressor inlet air temperature sensor circuitry in schematic form, FIG. 5 sets forth the gasifier r.p.m. counter and converter circuitry in schematic form, FIG. 6 sets forth the fan r.p.m. counter circuit in schematic form, the fan r.p.m. converter circuit, which is identical to the gasifier converter circuit, in block form and the fan speed limit circuitry in schematic form, FIG. 7 sets forth the acceleration schedule circuitry in schematic form, FIG. 8 sets forth the discriminator and fuel valve driver circuitry in schematic form, FIG. 9 sets forth the start sequence switches circuitry in schematic form, FIG. 10 sets forth the turbine temperature sensor circuitry and a proportional and integral temperature signal amplifier circuit in schematic form, and FIG. 11 sets forth the turbine temperature sensor and temperature signal amplifier power supply circuitry in schematic form.

For proper operation of any given jet type engine, it is necessary to supply fuel thereto in accordance with the characteristic weight of fuel/compressor discharge pressure vs. engine speed acceleration schedule curve of the engine corresponding to the ambient temperature in which the engine is being operated. FIG. 2 of the drawing sets forth a typical family of curves of this type for ambient temperatures of −65° F., 59° F, and 130° F.

The electronic fuel control system of this invention produces an electrical potential wave-form which substantially approximates the characteristic acceleration schedule curve of the engine for existing conditions of ambient temperature and engine compressor discharge pressure. A weight of fuel vs. engine speed potential curve derived from the acceleration schedule curve so produced operates the fuel control valve to supply the proper amount of fuel to the engine. That is, the fuel control system of this invention continuously computes the amount of fuel flow, in pounds per hour, which the jet engine with which it is being used requires for any engine compressor inlet temperature, compressor discharge pressure and engine speed and continuously adjusts the fuel control valve to supply the computed amount of fuel to the engine.

Without intention or inference of a limitation thereto, the fuel control system of this invention will be described in reference to a fan jet type engine and will be initially described in general in reference to the block diagram of FIG. 1.

The gasifier r.p.m. counter 10 and the fan r.p.m. counter 12 may be conventional magnetic type pick-up units of the type which produce a substantially sinusoidal alternating current signal which increases in frequency with increases in speed. The gasifier r.p.m. counter 10 may be mounted adjacent the turbine shaft and the fan speed r.p.m. counter 12 may be mounted adjacent the fan shaft.

To convert the substantially sinusoidal alternating current signals produced by the gasifier r.p.m. counter 10 and the fan r.p.m. counter 12, each of which increases in frequency with increases in speed of the engine and the fan, respectively, into respective direct current signals which increase in magnitude with an increase in frequency of these signals and, consequently, with an increase of engine speed and fan speed, respective converter circuits 14 and 16 are provided. The detailed operation of these converter circuits will be described in detail later in this specification.

The compressor inlet air temperature sensor 18 may be any suitable device which produces a direct current output signal which is proportional to temperature. For example, inlet air temperature sensor 18 may be a thermistor device mounted in the turbine inlet air stream or any other suitable device having similar electrical characteristics so mounted which produces a signal which increases in magnitude with increases of compressor inlet air temperature.

The compressor discharge pressure transducer 20 and the multiplier circuit 22 are shown in FIG. 4 to be combined in one unit. This unit is comprised of a bridge type circuit of piezoelectric resistive elements 23, 24, 25 and 26. This unit is responsive to the potential wave-form signal produced by the acceleration schedule circuitry of FIG. 7 and compressor discharge pressure to produce a potential wave-form signal which electrically represents the weight of fuel flow required, in pounds per hour, for any engine speed in a manner to be later explained in detail.

Power lever 28 may be a conventional potentiometer device, having a movable contact 29, which may be connected across a point of reference or ground potential and a source of negative polarity direct current potential, as shown in FIG. 3. It is to be specifically understood that any other suitable device for selectively providing a variable potential which is analogous to engine speed may be substituted for potentiometer 28 without departing from the spirit of the invention.

The turbine temperature sensor 30 may be any suitable temperature sensitive device which produces a direct current output signal which is proportional to temperature. This device is mounted upon the turbine in a location which truly reflects turbine temperature. In FIG. 10, turbine temperature sensor 30 is shown to be a conventional thermocouple device 31 and the associated calibrating circuitry including a calibrating resistor 32.

Fuel valve 38 is a commercially available device which regulates the amount of fuel supplied to the engine in response to input signals applied to a torque motor 39, FIG. 8. Torque motor 39 is a bi-directional motor which revolves in one direction with a selected polarity input signal and in the opposite direction with the opposite polarity input signal in a manner to be later explained.

Fuel valve 38 is so constructed that it tends to move toward a minimum fuel flow and its position is proportional to fuel flow. Included with fuel valve 38 is a fuel valve position transducer 40 which produces a direct current output signal which increases linearly from a negative polarity to a positive polarity and which is of a magnitude proportional to the fuel valve position. This signal is utilized to maintain fuel valve 38 in its last operated position until a change of fuel requirements dictates an adjustment of the fuel valve in one direction or the other, in a manner to be later explained.

The start sequence switches 42 have been indicated in FIG. 1 and shown in detail in FIG. 9, principally for the purpose of illustrating the capacity for providing a series of switches which may be energized at pre-selected engine speeds and will be explained in detail later in this specification.

FIG. 2 illustrates a typical family of weight of fuel/compressor discharge pressure versus engine speed in r.p.m. acceleration schedule curves, WF/CDP vs. r.p.m., each corresponding to respective ambient temperature, which are established by the characteristics of the engine with which the fuel control system of this invention is used. These curves graphically express the required fuel/air ratio at any engine speed for respective ambient temperatures.

As the engine is cranked and begins to revolve, the electrical signals produced by the gasifier r.p.m. converter 14 and the inlet air temperature sensor 18 are summed at summing point S1. The summed signal is employed by the acceleration schedule circuitry 44, FIG. 7, to produce an output potential wave-form signal which substantially duplicates the characteristic acceleration schedule curve for the specific engine with which the fuel control system is being employed which corresponds to the existing ambient temperature. The acceleration schedule circuitry is detailed in FIG. 7 and will be described in detail later in this specification.

The potential wave-form signal produced by acceleration schedule circuit 44 is multiplied by the compressor discharge pressure in the piezoelectric resistive element bridge circuit previously described in a manner to be later explained. Therefore, the output potential wave-form from the multiplier is a potential wave-form signal which electrically represents the weight of fuel required for any engine speed at the existing ambient temperature. This signal is applied to the fuel valve driver 46. Fuel valve driver 46 may be a conventional operational type amplifier which is a commercially available item.

Operational amplifiers are direct current amplifiers, having an inverting and non-inverting input circuit and an output circuit, which may be designed to have a gain proportional to the feedback impedance connected between the output and the inverting input circuit divided by the input impedance. Operational amplifiers invert the polarity of the signal applied to the inverting input but do not invert the signal applied to the non-inverting input.

The fuel valve driver 46 is responsive to the potential wave-form signal produced by the compressor discharge pressure transducer 20 which electrically represents the weight of fuel required for any engine speed to adjust fuel valve 38 in a direction to supply the required fuel flow to the engine as computed by the acceleration schedule circuitry and the compressor discharge pressure transducer and multiplier circuitry.

The positive polarity direct current signal produced by the gasifier r.p.m. converter 14, which is representative of engine speed, is also directed to a compare circuit 48 which may be a conventional, commercially available operational type amplifier as schematically illustrated in FIG. 3.

Power lever 28 supplies a negative polarity direct current signal to compare circuit 48 which is of a magnitude proportional to what the engine speed should be for any power lever setting. With the actual engine speed being less than the speed represented by the potential signal supplied to compare circuit 48 from power lever 28, the output from compare circuit 48 is substantially zero and the engine accelerates along the computed acceleration schedule curve. When the actual engine speed reaches the speed corresponding to the power lever setting, a signal appears at the output circuit of compare circuit 48 which is applied to fuel driver 46 in a direction to reduce or subtract the flow of fuel to the engine. When the fuel valve is closed to this point, the feedback signal produced by the fuel valve position transducer 40 is of the proper magnitude and polarity to stabilize the system at this speed.

Should the turbine temperature increase beyond an allowable maximum magnitude, turbine temperature sensor 30 becomes operative to produce a limit signal at the output of limit circuit 50 in a manner to be later explained. This signal is applied to a discriminator circuit 51, FIG. 8, which operates to direct this signal to fuel valve driver 46 while the engine is accelerating on the acceleration schedule curve and to direct this signal to compare circuit 48 while the engine is operating on the power lever.

Should the fan speed exceed a predetermined allowable r.p.m., fan r.p.m. converter 16 produces a signal at the output of limit circuit 52, in a manner to be later explained, which is applied to compare circuit 48.

The limit signals produced by both limit circuits 50 and 52 are of the proper polarity to bias fuel valve driver 46 in a direction to decrease the fuel flow to the engine thereby automatically preventing engine conditions of over-temperature or over-speed in a manner to be described later in detail.

The gasifier r.p.m. converter 14, which converts the alternating current signal produced by the gasifier r.p.m. counter into a direct current signal which is of a positive polarity and increases in magnitude with increases in engine speed, is set forth schematically in FIG. 5. As the fan r.p.m. converter 16 is identical to gasifier r.p.m. converter 14, in the interest of reducing drawing complexity, the fan r.p.m. converter 16 has been set forth in block form in FIG. 6. Therefore, the circuit will be described in reference to FIG. 5.

Type NPN transistors 55 and 56, having their respective base electrodes connected to opposite ends of the secondary winding 57 of an isolating transformer 58, are alternately triggered conductive and non-conductive by the alternating current signal produced by gasifier r.p.m. counter 10. Transistor 55 is inserted in this circuit for purposes of balance and in no way affects the operation of the remainder of the circuit.

As transistor 56 is triggered non-conductive with each alternate half cycle of the alternating current signal produced by gasifier r.p.m. counter 10, the potential at point 53 goes positive.

A positive polarity potential at point 53 produces base-emitter current flow through forward poled type NPN transistor 60, thereby triggering this device conductive in a manner well known in the art. With transistor 60 in the conducting state, the potential of point 54 goes substantially to ground thereby placing the base and emitter electrodes of transistor 61 at substantially the same potential, a condition which extinguishes normally conducting transistor 61.

With transistor 60 conducting and transistor 61 not conducting, capacitor 62 begins to charge from the positive polarity potential line, through resistor 63 and the collector-emitter electrodes of transistor 60 to ground and capacitor 64 begins to charge from the positive polarity potential line through resistor 65 and resistor 66 to the negative polarity potential line.

Upon the initiation of the charge of capacitor 64, base-emitter current flows through forward poled type NPN transistor 68, triggering this device conductive. This device remains conductive until capacitor 64 has become substantially fully charged. At this time, the circuit for providing base-emitter current through transistor 68 is interrupted by capacitor 64, therefore, transistor 68 goes non-conductive.

During the period of conduction of transistor 68, while capacitor 64 is charging, capacitor 69 begins to discharge through the collector-emitter electrodes of conducting transistor 68. As capacitor 69 begins to discharge, point 59 goes negative to reverse bias diode 70 to interrupt the circuit which provides base-emitter current through normally conducting type NPN transistor 71, a condition which extinguishes this device.

With transistor 71 in the non-conducting state, the potential at point 67 goes positive to produce base-emitter current through forward poled type NPN transistor 72, thereby triggering this device conductive.

Upon the completion of the charging of capacitor 64, the circuit through which base-emitter current is supplied to transistor 68 is interrupted by capacitor 64, therefore, transistor 68 goes non-conductive. With transistor 68 in the non-conducting state, capacitor 69 begins to charge from the positive polarity potential line through diode 73 and resistor 74 to ground.

When the charge upon the plate of capacitor 69 which is connected to junction 59 has reached a pre-selected positive polarity value, base-emitter current begins to flow through transistor 71, thereby triggering this device conductive. Upon the conduction of transistor 71, the potential of point 67 goes substantially to ground, thereby placing the base and emitter electrodes of transistor 72 at substantially the same potential, a condition which extinguishes this device.

The output from transistor 72 is taken across emitter resistor 75. With transistor 72 in the non-conducting state, the signal across emitter resistor 75 is substantially zero or ground and with transistor 72 conducting, the signal appearing across emitter resistor 75 is of a positive polarity in respect to ground. Therefore, the signal appearing across emitter resistor 75 goes from substantially ground to a positive polarity value for a duration equal to the period of time during which transistor 71 is not conducting. As the period of non-conduction of transistor 71 is determined by the time constant of the R–C network comprising the series combination of resistor 74 and capacitor 69, the width of the output signal pulse is substantially constant and is determined by the time constant of the network just described.

When capacitor 62 has become fully charged through the collector emitter electrodes of transistor 60, the potential of point 54 goes positive to produce base-emitter current flow through transistor 61, thereby triggering this device conductive. With transistor 61 conducting, capacitor 64 discharges to ground through the collector-emitter electrodes thereof, thereby preparing this capacitor to receive a charge during the next half cycle of the signal produced by gasifier r.p.m. counter 10 of the same polarity.

As has been previously brought out, the pulses appearing across emitter electrode 75 of the gasifier r.p.m. converter are of a positive polarity and of a constant duration. As the speed of the engine and, consequently, the frequency of the alternating current signal produced by gasifier r.p.m. counter 10 increases, these output pulses appear more frequently or, are closer together in time.

Inductor 76 and capacitor 77 average the potential of these signals to produce an output signal across capacitor 77 which increases linearly in a positive direction with an increase of engine speed.

This signal may be amplified by a conventional power amplifier comprising transistors 78 and 79 interconnected in a conventional manner. The positive polarity signal which is of a magnitude proportional to engine speed may be taken across resistor 80 and will hereinafter be designated as the engine speed signal, ES.

The compressor inlet air temperature sensing circuitry is schematically set forth within the dashed line rectangle 18 of FIG. 4. A transistor 85, the series combination of resistor 86 and diode 87, connected between the positive polarity potential line and the base electrode of transistor 85, resistor 88, connected between the base electrode of transistor 85 and ground, and collector resistor 89, connected between the positive polarity potential line and the collector electrode of resistor 85, constitutes a constant current device.

The compressor inlet air temperature sensing device 90, which may be a thermistor or nichrome element or any other device which is characterized by a change of electrical resistance with temperature, is connected between the constant current device and ground. While the temperature sensing device 90 shown in FIG. 4 is of a type having a positive temperature co-efficient, it is to be specifically understood that devices possessing opposite temperature co-efficient characteristics may be employed with compatible circuitry without departing from the spirit of the invention.

The electrical signal which is proportional to compressor inlet air temperature is of a positive polarity which increases in magnitude with increases in compressor inlet air temperature and may be taken from across the inlet air temperature sensing device 90 from junction 91. This signal will hereinafter be referenced as IT.

Type NPN transistor 95 and the associated circuitry comprises a compressor inlet air temperature signal inverter which is responsive to the compressor inlet air temperature signal to produce an inverted compressor inlet air temperature signal. The collector electrode thereof is connected to the positive polarity potential line through collector resistor 96, the emitter electrode is connected to the negative polarity potential line through series emitter resistors 97 and 98 and the base electrode is connected to junction 91. With increases in compressor air inlet temperature, the compressor inlet temperature signal IT becomes more positive, a condition which drives types NPN transistor 95 more conductive. As the signal produced by transistor 95 is taken from the collector electrode thereof at junction 99, as transistor 95 increases conduction, the polarity of this signal becomes increasingly negative. This inverted compressor inlet air temperature signal will hereinafter be referred to as ITi.

The acceleration schedule circuitry 44, FIG. 1, which produces a potential wave-form signal which substantially duplicates the acceleration schedule curves of FIG. 2 is schematically set forth in FIG. 7.

Included in this circuitry are two conventional operational amplifiers 100 and 101, each having an inverting in put circuit terminal 2, a non-inverting input circuit terminal 5, and an output circuit terminal 7.

With both of these operational amplifiers, terminals 1 and 8 are connected to the positive polarity line, terminals 2 and 7 are interconnected through respective feedback resistors 102 and 103, terminals 3 and 10 are interconnected through respective capacitors 104 and 105, terminals 4 and 9 are interconnected through respective capacitors 106 and 107, terminal 5 is connected to a point of reference or ground potential through respective resistors 108 and 109 and terminal 6 is connected to the negative polarity potential line.

To balance operational amplifier 100, a balancing network comprised of the series combination of resistor 110, potentiometer 111, having a movable contact 112, and resistor 113 connected across the positive and negative polarity potential lines, and resistors 114 and 115 connected between respective opposite ends of potentiometer 111 and a point of reference or ground potential is provided. With all of the input circuits of operational amplifier 100 grounded, movable contact 112 of potentiometer 111 is adjusted for zero output. A similar balancing network is provided for operational amplifier 101 and consists of the series combination of resistor 116, potentiometer 117, having a movable contact 118, and resistor 119 connected across the positive and negative polarity potential lines and resistors 120 and 121 connected between respective opposite ends of potentiometer 117 and a point of reference or ground potential.

Also included in the acceleration schedule circuitry are first and second amplifier circuits comprising double complementary transistors 122 and 123 and the associated circuitry for amplifying and twice amplifying the engine speed signal ES, respectively. The emitter-collector electrodes of the type PNP portion of these transistors are connected between the positive polarity potential line and a point of reference or ground potential through respective collector resistors 124 and 125. The collector-emitter electrodes of the type NPN portion of these transistors are connected between the positive polarity potential line and a point of reference or ground potential through the emitter-base junction of the type PNP portion and respective resistors 124 and 125. Therefore, these devices are forward poled.

The base electrode of double transistor 122 is connected to the junction between resistors 128 and 129 which are connected in series between junction 127 and the negative polarity potential line. The series combination of resistors 131 and 132 is connected across the negative polarity potential line and a point of reference or ground potential and the series combination of resistors 133 and 134 is connected between junction 127 and the junction between resistors 131 and 132. The base electrode of the NPN portion of double transistor 123 is connected to the junction 130 between series resistors 133 and 134.

The positive polarity direct current engine speed signal ES, the magnitude of which is proportional to engine speed, which is produced by gasifier r.pm. converter circuit 14 schematically set forth in FIG. 5 previously described, and which appears on terminal ES of FIG. 5, is applied across series resistors 128 and 129 and the series-parallel combination of resistors 133, 134, 131 and 132, as indicated. Resistors 128 and 129 and resistors 133, 134, 131 and 132 are so proportioned that, at a pre-selected engine speed, the engine speed signal ES is of a sufficient positive polarity magnitude to produce base-emitter current flow through the NPN portion of both double transistors 122 and 123 to trigger these devices conductive.

The inverting input circuit terminal 2 of operational amplifier 100, which is responsive to the engine speed signal and the inverted compressor inlet air temperature signal to disenable the second amplifier circuit comprising double complementary transistor 123 when the engine reaches a predetermined speed in a manner to be later explained, is connected to a point of reference or ground potential through resistor 135, to the negative polarity potential line through resistor 136 for the purpose of establishing an operating bias, to the balance network through resistor 137, to the inverted compressor inlet air temperature signal ITi through resistor 138 and to the engine speed signal ES through resistor 139. Of these five inputs, only the inverted inlet air temperature signal ITi and the engine speed signal ES are variable and the function of these signals and operational amplifier 100 will be later described.

The inverting input circuit terminal 2 of operational amplifier 101, which is responsive to the engine speed signal, the twice amplified engine speed signal and the compressor inlet air temperature signal for producing an acceleration schedule potential wave-form which substantially electrically duplicates the acceleration schedule curve in a manner to be later explained, is connected to a source of negative bias potential through resistor 140 which is connected to the junction between the series combination of resistors 141 and 142 connected across the positive and negative polarity lines, respectively, for the purpose of establishing an operating bias, to the compressor inlet air temperature signal IT through resistor 143, to the balance network through resistor 144, to the amplified engine speed signal which is taken off collector resistor 124 of the PNP portion of double transistor 122 through resistor 145 and to the twice amplified engine speed signal which is taken off collector resistor 125 of the PNP portion of double transistor 123 through resistor 146.

The compressor inlet air temperature signal IT, which is applied to inverting input circuit terminal 2 of operational amplifier 101 through resistor 143, establishes the initial magnitude of the potential wave-form signal produced by operational amplifier 101 and, consequently, the acceleration schedule curve which the fuel control system of this invention will substantially reproduce as determined by the ambient temperature, the amplified engine speed signal, applied through resistor 145, determines the final slope of the established acceleration schedule curve and the twice amplified engine speed signal, applied through resistor 146, determines the point along the established acceleration curve at which the knee of the acceleration schedule curve will occur over a range of engine speeds. That is, the compressor air temperature singal IT determines which one of the family of acceleration schedule curves, only three of which are shown in FIG. 2, which is to be followed as determined by the ambient temperature, the amplified engine speed signal determines the final slope of the curve and the twice amplified engine speed signal establishes the engine speed at which the knee of the curve will occur.

Upon starting, the compressor inlet air temperature signal IT is applied to inverting input circuit terminal 2 of operational amplifier 101 and produces an output signal on the output circuit terminal 7 thereof of a negative polarity and of a magnitude corresponding to the ambient temperature. For example, with an ambient temperature of 59° F., the output signal of operational amplifier 101 would be of a magnitude equal to that shown by the 59° F., acceleration schedule curve of FIG. 2 at zero engine speed. The inverted inlet air temperature signal IT$i$ is simultaneously applied to the inverting circuit terminal 2 of operational amplifier 100 to produce a positive polarity output signal at the output terminal 7 thereof. As diode 147 is poled to block positive polarity signals appearing an output circuit terminal 7 of operational amplifier 100, this output signal is of no consequence at this time.

As the engine begins to accelerate, the positive polarity engine speed signal ES is applied to inverting circuit terminal 2 of operational amplifier 100 through resistor 139. Initially, this signal is not of sufficient magnitude to overcome the negative polarity inverted compressor inlet air temperature signal IT$i$. Consequently, at low engine speeds, the engine speed signal ES has no effect upon operational amplifier 100.

When the accelerating engine has reached the pre-selected speed, double transistors 122 and 123 begin to conduct in a manner previously explained. With these devices conducting, the positive polarity amplified and twice amplified engine speed signals begin to appear across respective resistors 124 and 125 and are summed with the compressor inlet air temperature signal IT. These summed signals are applied to inverting input circuit terminal 2 of operational amplifier 101. Therefore, the magnitude of the positive polarity signal applied to inverting input circuit terminal 2 of operational amplifier 101 begins to increase at the pre-selected engine speed, consequently, the output signal appearing across output circuit terminal 7 thereof and a point of reference or ground potential begins to go more negative at the pre-selected engine speed. This point is the beginning of the knee on the acceleration schedule curve.

Although the acceleration schedule curve produced by operational amplifier 101 is of a negative polarity with respect to a point of reference or ground potential, the acceleration schedule curves have been shown in FIG. 2 to be in the positive polarity quadrant for ease of understanding. That is, the acceleration schedule curves have the same form as shown in FIG. 2 except they are of a negative rather than of a positive polarity.

As the accelerating engine continues to increase in speed:

(1) The positive polarity amplified and twice amplified engine speed signals increase in magnitude, consequently, the output signal of operational amplifier 101 goes correspondingly more negative to produce the first half of the knee of the acceleration schedule curve, and, (2) The engine speed signal ES, applied to inverting circuit terminal 2 of operational amplifier 100, also increases in magnitude and begins to overcome the negative polarity inverted compressor inlet air temperature signal IT$i$, consequently, the output signal of operational amplifier 100 goes correspondingly less positive.

At the engine speed at which the positive polarity engine speed signal ES is of sufficient magnitude to overcome the negative polarity inverted compressor inlet air temperature signal IT$i$, the output signal of operational amplifier 100 passes through zero and begins to go negative, a condition which forward poles diode 147. As diode 147 begins to conduct, the potential of junction 130 goes less positive, thereby reducing the base-emitter drive current through the NPN portion of double transistor 123, consequently, this device begins to conduct less.

As the accelerating engine continues to increase in speed above this point, the positive polarity engine speed signal ES continues to increase in magnitude and, consequently, the output signal of operational amplifier 100 goes correspondingly more negative, thereby biasing diode 147 to become increasingly more conductive. With increasing conduction through diode 147, the potential of junction 130 goes correspondingly less positive, thereby correspondingly reducing the degree of conduction through double transistor 123. Therefore, operational amplifier 100 has begun to disenable the second amplifier. Decreasing conduction through double transistor 123 with increasing engine speed results in a correspondingly decreasing twice amplified engine speed signal appearing across resistor 125, consequently, the output signal of operational amplifier 101 goes correspondingly less negative to produce the last half of the knee of the acceleration schedule curve.

With a further increase of engine speed and a corresponding increase in magnitude of the positive polarity engine speed signal ES, a point is reached at which the output signal of operational amplifier 100 is of a sufficient negative polarity magnitude to reduce the potential of junction 130 to a value at which the base-emitter drive current through the NPN portion of double transistor 123 is reduced below a value which will maintain conduction therethrough, consequently, this device extinguishes and completely disenables.

With double transistor 123 extinguished, the twice apmlified engine speed signal is removed from inverting input circuit terminal 2 of operational amplifier 101. Upon the removal of this signal from inverting input circuit terminal 2 of operational amplifier 101, the output signal therefrom becomes more negative and begins to follow the final slope of the selected acceleration schedule curve, as determined by the magnitude of the amplified engine speed signal applied through resistor 145.

Therefore, the output signal appearing at output terminal 7 of operational amplifier 101 is the electrical equivalent of the acceleration schedule curve WF/CDP vs. r.p.m. and may be amplified by a conventional emitter follower amplifier circuit comprising type PNP transistor 150 and emitter resistor 151. With the circuit as set forth in FIG. 7, the amplified acceleration schedule curve AS may be taken from across emitter resistor 151 and appears at the terminal so labelled. It is to be specifically understood, however, that with certain applications, the emitter follower power amplifier circuit may be omitted. In this event, the acceleration schedule signal AS would appear at output circuit terminal 7 of operational amplifier 101.

The amplified acceleration schedule signal AS is applied across opposite corners of the compressor discharge pressure transducer bridge 20, as shown in FIG. 4, which is responsive to the acceleration schedule potential waveform signal and compressor discharge pressure to produce a potential wave-form signal which electrically represents the weight of fuel required for any engine speed.

The piezoelectric pressure sensitive devices 23, 24, 25 and 26 comprising the bridge of compressor discharge pressure transducer 20 are so proportioned that this device will produce an output signal of a specified magnitude per input volt per selected p.s.i. In a practical application, this device produced an output signal of 40 mv. per input volt per 100 p.s.i. That is, the output of this device will vary in response to changes of both input potential signal, the acceleration schedule signal AS, and the compressor discharge pressure. Therefore, the compressor discharge pressure transducer substantially multiplies the acceleration schedule signal AS, which is the electrical equivalent of the weight of fuel/compressor discharge pressure vs. engine speed curve, WF/CDP vs. r.p.m., by the compressor discharge pressure. The output signal, therefore, is the electrical equivalent of the weight of fuel vs. engine speed curve, WF vs. r.p.m., at existing conditions of ambient temperature.

The output of the compressor discharge pressure transducer 20 is applied across the inverting circuit terminal 2 and non-inverting circuit terminal 5 of a conventional operational amplifier 160 through resistors 161 and 162, respectively. The amplified weight of fuel signal WF, appears at the output circuit terminal 7 of operational amplifier 160 and may be taken from the terminal so labelled.

As with operational amplifiers 100 and 101, a similar balancing network comprising the series combination of resistor 163, potentiometer 164, having a movable contact 165, and resistor 166 connected across the positive and negative polarity lines and the parallel combination of resistors 167 and 168 connected between respective opposite ends of potentiometer 164 and a point of reference or ground potential is provided for operational amplifier 160 and a feedback resistor 170 is interconnected between output terminal 7 and inverting input circuit terminal 2. The various input and output terminals of operational amplifier 160 are interconnected in a manner similar to operational amplifiers 100 and 101, therefore, these interconnections will not be here described in detail.

The weight of fuel signal WF, which appears at output circuit terminal 7 of operational amplifier 160, is the electrical equivalent of the curve which represents the weight of fuel required for any engine speed at existing conditions of ambient temperature.

The electronic fuel control system of this invention is provided with protection features which automatically operate to reduce the amount of fuel supplied to the engine in response to conditions of over-speed or over-temperature. Of these two features, the over-speed protection feature will be initially described.

As the speed of the fan is proportional to engine speed, the signal produced by the fan r.p.m. counter 12 and the fan r.p.m. converter 16 may be utilized for the purpose of providing an over-speed signal. Referring to FIG. 6, the fan r.p.m. converter 16, which converts the alternating current signal produced by the fan r.p.m. counter 12 into a direct current signal which is of a positive polarity and increases in magnitude with increases in fan speed, is identical to gasifier r.p.m. converter 14, schematically set forth in FIG. 5 and previously described in detail. Therefore, in the interest of reducing drawing complexity, fan r.p.m. converter 16 has been shown in block form in FIG. 6.

Over-speed limit circuitry 52, FIG. 1, may be comprised of a conventional operational type amplifier 173 and the associated interconnecting circuitry. As with operational amplifiers 100 and 101, a similar balancing network comprising the series combination of resistor 174, potentiometer 175, having a movable contact 176, and resistor 177 connected across the positive and negative polarity lines and the parallel combination of resistors 178 and 179 connected between respective opposite ends of potentiometer 175 and a point of reference or ground potential, is provided and a feedback resistor 180 is interconnected between output circuit terminal 7 and inverting input circuit terminal 2. The various input and output terminals of operational amplifier 173 are interconnected in a manner similar to operational amplifiers 100 and 101, therefore, these interconnections will not be here described in detail.

The inverting input circuit terminal 2 of operational amplifier 173 is connected to a point of reference or ground potential through resistor 181, to the negative polarity potential line through resistor 182, for the purpose of establishing an operating bias, to the balance network through resistor 183 and to the fan r.p.m. converter output through resistor 184. Of these four inputs, only the signal produced by the fan r.p.m. converter 16 is variable.

Negative polarity bias resistor 182 is selected to be of a value which will maintain the polarity of the output signal of operational amplifier 173 positive until the fan has reached a predetermined maximum speed. Therefore, there is no fan speed signal FS present upon the terminal so labelled until the fan has reached or exceeded the predetermined maximum speed at which the positive polarity operational amplifier 173 output signal reverse poles diode 185.

As the speed of the fan increases from zero to maximum, the positive polarity signal produced by fan r.p.m. converter 16 and applied to inverting input circuit terminal 2 of operational amplifier 173 through resistor 184 increases substantially linearly in magnitude and, therefore, gradually overcomes the negative polarity bias signal applied to inverting input circuit terminal 2 from the negative polarity line through resistor 182. Consequently, the signal appearing at output terminal 7 of operational amplifier 173 reduces substantially linearly from a maximum positive polarity magnitude, at zero fan speed, to substantially zero at the pre-selected maximum fan speed. As this signal passes through zero and begins to go negative in polarity, diode 185 becomes forward poled and a fan speed signal FS appears upon the output terminal so labelled.

To produce an over-temperature limit signal with conditions of turbine over-temperature, a proportional and integral signal amplifier circuit for producing an electrical indicating signal which indicates a selected condition and is of a magnitude proportional to the degree thereof and an output signal which is proportional to and an integral of the indicating signal in combination with a direct current condition signal source and a direct current reference signal source, is provided.

In the novel electronic fuel control system of this invention, the selected condition is turbine over-temperature, the direct current condition signal is an electrical signal proportional to turbine temperature, the direct current reference signal is a substantially constant direct current potential and the electrical indicating signal is an alternating current signal which indicates a condition of turbine over-temperature and is of a magnitude proportional to the degree of over-temperature. The sources of the signals will be explained in detail later in this specification.

With the presence of an electrical indicating signal which indicates an over-temperature condition and is of a magnitude which is proportional to the degree of over-temperature, the circuit set forth in FIG. 10 produces an output signal which continues to increase substantially linearly in magnitude at a rate proportional to the degree of over-temperature so long as the over-temperature condition exists.

The turbine temperature sensor circuitry which produces the direct current condition signal, the reference signal source and the proportional and integral signal amplifier circuit is schematically set forth in FIG. 10 and a power supply circuit which provides direct current operating potentials and alternating current switching signals suitable for use with the circuitry of FIG. 10 is schematically set forth in FIG. 11.

The circuitry within dashed rectangle 188, FIG. 11, comprises a conventional transistorized potential regulator and the circuitry within dashed rectangle 189 comprises a conventional push-pull oscillator circuit which is designed to operate from a source of direct current potential. As these circuits are conventional circuits well known in the art and, per se, form no part of this invention, they will not be described in detail in this specification. In a practical application, oscillator 189 was designed to oscillate at a frequency of 1,000 cycles per second, however, it is to be specifically understood that this device may be designed to oscillate at any other suitable frequency.

To isolate the turbine temperature sensor circuitry and the signal amplifier circuitry from the power supply, an isolating transformer 190 having primary windings 191 and 192, which are a portion of the "tank" circuit and regenerative feedback circuit, respectively, of oscillator 189, and three center tapped secondary windings 193, 194 and 195 may be employed. The end terminals of each of secondary windings 193 and 194 are connected to the alternating current input circuit terminals of respective diode bridge type full-wave rectifier circuits 196 and 197 and the end terminals of secondary winding 195 are connected to the alternating current input circuit terminals of a two diode full-wave rectifier circuit 198. To completely isolate the turbine temperature sensor circuitry and the signal amplifier circuitry from system ground, the center taps of each of secondary windings 193, 194 and 195 are employed as a direct current return to each of the respective rectifier circuits. With this arrangement, extremely stable turbine temperature sensor and over-temperature limit circuit operation is realized as these circuits are substantially unaffected by transient potentials or spurious signals which may occur in the remainder of the electronic fuel control circuitry.

A direct current potential of a positive polarity with respect to the center tap of primary winding 193 appears at terminal E, a direct current potential of a negative polarity with respect to the center tap of a secondary winding 193 appears at terminal C, a direct current potential of a positive polarity with respect to the center tap of secondary winding 194 appears at terminal J, a direct current potential of a negative polarity with respect to the center tap of secondary winding 194 appears at terminal H, a direct current potential of a positive polarity with respect to the center tap of secondary winding 195 appears at terminal K, alternating current switching signals of a frequency equal to the operating frequency of oscillator 189 appear across terminals B and D and separate alternating current switching signals of the same frequency appear across terminals G and I.

FIGS. 10 and 11 should be considered together and direct electrical connections between similarly labelled terminals in the respective figures. For example, there is a direct electrical connection between terminal A of FIG. 10 and terminal A of FIG. 11.

The turbine temperature sensor circuitry 30 which provides the direct current condition signal is schematically set forth within dashed rectangle 30 of FIG. 10 and comprises a thermocouple 31, having a "Chromel"-"Alumel" junction which is suitably mounted on the turbine, a thermosensitive compensating resistor 32 and the necessary temperature calibrating circuitry. The temperature calibrating circuitry comprises the series combination of potentiometer 200, resistor 201 and Zener diode 202 connected across positive polarity direct current output terminal E of rectifier 196 and direct current return terminal A, connected to the center tap of secondary winding 193, and the parallel combination of a calibrating potentiometer 203 and resistor 204 connected in series with resistor 205 and compensating resistor 32. Zener diode 202 establishes a substantially constant potential across junctions 208 and 209.

The circuitry which provides a stable and substantially constant direct current reference signal of a positive polarity is also schematically set forth in FIG. 10. Connected across junctions 208 and 209 is a series-parallel resistance network comprising series connected resistors 210 and 212 connected in parallel with series connected resistor 214 and potentiometer 215, having a movable contact 216. The junction between resistors 210 and 214 is connected to junction 208 and the junction between resistor 212 and one end of potentiometer 215 is connected to junction 209. The substantially constant reference signal may be taken from junction 220 between resistors 210 and 212. To precisely adjust the reference signal magnitude, movable contact 216 of potentiometer 215 may be connected through resistor 217 and the normally closed contacts of relay 218 to junction 220.

Under certain conditions, it may be necessary to produce an over-temperature limit signal at another value of turbine temperature. To produce and select the proper reference signal under these conditions, another resistance network is provided.

Also connected across junctions 208 and 209 is another series parallel resistance network comprising series connected resistors 210 and 212 connected in parallel with series connected resistor 222, potentiometer 223 having a movable contact 224 and resistor 225. In this resistance network, the junction between resistors 212 and 225 is connected to junction 209. To precisely adjust the magnitude of the reference signal provided by this resistance network, movable contact 224 of potentiometer 223 may be connected through resistor 226 and the normally open contact of relay 218 to junction 220.

With this arrangement, the resistance network comprising resistors 210, 212, 214 and potentiometer 215 is normally in the circuit. To select the alternate reference signal, operating coil 228 of single pole, double throw relay 218 may be energized to place the resistance network comprising resistors 210, 212, 222, potentiometer 223 and resistor 225 in the circuit.

As is well known in the art, a thermocouple device is calibrated on the basis of the cold junction thereof being immersed in ice water. Compensating resistor 32 and the calibrating circuitry previously described compensates for the cold junction of thermocouple 31 not being immersed in ice water, consequently, with this circuitry, thermocouple 31 produces an output signal which is accurately proportional to turbine temperature at any ambient temperature. This positive polarity turbine temperature signal, the direct current condition signal, may be taken from point or junction 240.

To produce an over-temperature signal with the circuitry schematically set forth in FIG. 10, the substantially constant reference signal is selected to be of a magnitude substantially equal to the magnitude of the turbine temperature condition signal produced by thermocouple 31 at the maximum allowable turbine temperature of the engine with which the fuel control system of this invention is being used. The reference and temperature condition signals are compared and circuitry is provided for determining which of the two is of the greater magnitude. With the reference signal of a greater magnitude than the temperature condition signal, there is no output signal, however, with the temperature condition signal of a greater magnitude than the reference signal, the circuitry of FIG. 10 produces an over-temperature output signal OT which appears on the terminal so labelled.

To compare the reference and temperature condition signals and to produce an alternating current electrical indicating signal of one phase when the condition signal is of a magnitude less than the reference signal, of the opposite phase when the condition signal is of a magnitude greater than the reference signal and of a magnitude proportional to the degree of difference, a conventional operational amplifier 230 having an inverting input circuit terminal 1, a non-inverting circuit terminal 2 and an output circuit terminal 5 in combination with a modulator circuit comprising four field effect transistor devices 235, 236, 237 and 238, each having a source electrode B1, a drain electrode B2 and a gate electrode E, is provided.

The N channel junction field effect transistor is a semiconductor device which will conduct current in either direction therethrough with a potential present upon the gate electrode E, with respect to that present upon the source electrode B1, which is more positive than the pinchoff voltage and will block the flow of current therethrough with a potential present upon the gate electrode E, with respect to that present upon source electrode B1, which is more negative than the pinchoff voltage.

Output circuit terminal 5 of operational amplifier 230 is interconnected with inverting input circuit terminal 1 through a feedback resistor 239, terminal 4 is returned to the negative polarity direct current terminal of bridge rectifier 196, FIG. 11, through terminal C and terminals 6, 7 and 8 are returned to the positive polarity direct current terminal of rectifier 196, FIG. 11, through terminal E. Although the specific connections to operational amplifier 230 are not identical to the interconnections between the previously described operational amplifiers, this device works in an identical manner.

The source electrode B1 of each of field effect transistors 235 and 236 of the modulator circuit is connected to junction 220, from which the reference signal may be taken, and the source electrode B1 of each of field effect transistors 237 and 238 of the modulator circuit is connected to junction 240, from which the temperature condition signal may be taken. The drain electrode B2 of each of field effect transistors 235 and 238 of the modulator circuit is connected to non-inverting input circuit terminal 2 of operational amplifier 230 through resistor 245 and the drain electrode B2 of each of field effect transistors 236 and 237 of the modulator circuit is connected to inverting input circuit terminal 1 of operational amplifier 230 through resistor 246. The gate electrode E of each of field effect transistors 235 and 237 of the modulator circuit is connected to one terminal end of secondary winding 193, FIG. 11, through resistor 247 and terminal B and the gate electrode E of each of field effect transistors 236 and 238 of the modulator circuit is connected to the opposite terminal end of secondary winding 193, FIG. 11, through resistor 248 and terminal D. Therefore, the switching signals are applied to the gate electrodes of field effect transistors 235 and 237 and to the gate electrodes of field effect transistors 236 and 238 in an opposite phase relationship. Diodes 250 and 251 limit the magnitude of positive potential applied to the gate electrodes of field effect transistors 235 and 237 and field effect transistors 236 and 238, respectively. In each instance, the magnitude of the positive potential applied to the gate electrodes is equal to the potential drop across the respective diodes 250 or 251. The gate voltage is switched from this small positive signal to a relatively large negative signal. The magnitude of the negative signal is determined by the power supply design.

The modulator circuit is responsive to the alternating current switching signals and operates to connect each the reference and temperature signals to a respective input circuit terminal of operational amplifier 230 and to simultaneously switch each of these signals to the opposite input circuit terminal of operational amplifier 230 at a frequency determined by the frequency of the alternating current switching signals, the operating frequency of oscillator 189, in a manner to be later explained in detail.

To provide a proportional and integral output signal when the temperature condition signal is of a greater magnitude than the reference signal, another operational amplifier 260 having an inverting input circuit terminal 1, a non-inverting input circuit terminal 2 and an output circuit terminal 5 in combination with a de-modulator circuit comprising field effect transistors 261 and 262, each having a source electrode B1, a drain electrode B2 and a gate electrode E, is provided.

Connected between output terminal OT and inverting input circuit terminal 1 of operational amplifier 260 is the series combination of a capacitor 263 and a resistor 264. With this feedback circuit, operational amplifier 260 produces an output signal which is proportional to and is an integral of the difference between the reference and temperature signals when the temperature signal is of a magnitude greater than that of the reference signal.

To provide isolation, the output signal from operational amplifier 230 is coupled to the inverting input circuit terminal of operational amplifier 260 through a capacitor 265 and a coupling transformer 300 having a primary winding 302 and a center tapped secondary winding 303. Capacitor 265 prevents the presence of any direct current potential component across primary winding 302. The source electrode B1 of each of field effect transistors 261 and 262 of the de-modulator circuit is connected to a respective end of center tapped secondary winding 303 and the drain electrode B2 of both these field effect transistors is connected to inverting input circuit terminal 1 of operational amplifier 260 through resistor 306. The gate electrode E of field effect transistor 261 and the gate electrode E of field effect transistor 262 are connected to respective opposite ends of secondary winding 194, FIG. 11, through respective resistors 173 and 174 and respective terminals G and I. Therefore, the switching signals are applied to the gate electrodes of field effect transistors 261 and 262 in an opposite phase relationship. As with the modulator circuit field effect transistors, the magnitude of the positive potential applied to the gate electrode E of each of field effect transistors 261 and 262 of the de-modulator circuit is limited to the magnitude of the potential drop across diodes 175 and 176, respectively.

The demodulator circuit is responsive to the alternating current switching signals and operates to alternately connect opposite ends of secondary winding 303 to the inverting input terminal of operational amplifier 260 at a frequency determined by the frequency of the alternating current switching signals, in a manner to be later explained in detail.

With these connections, therefore, in-phase alternating current switching signals of a frequency determined by the operating frequency of oscillator 189 are applied to the gate electrodes of the modulator and de-modulator field effect transistors through respective terminal pairs B–D and G–I.

Over each half cycle of the alternating current switching signals applied to the gate electrodes of all of the field effect transistors during which this signal is of a positive polarity at terminals B and G and of a negative polarity at terminals D and I, field effect transistors 235, 237 and 261 and are gate biased conductive and field effect transistors 236, 238 and 262 are gate biased non-conductive. During the alternate half cycles, of course, field effect transistors 236, 238 and 262 are gate biased conductive and transistors 235, 237 and 261 are gate biased non-conductive.

For purposes of describing the operation of the modulator and de-modulator circuits, those half cycles of the alternating current switching signals during which terminals B and G are of a positive polarity and terminals D and I are of a negative polarity will be referred to as the first half cycles and those half cycles of the alternating current switching signals during which terminals D and I are of a positive polarity and terminals B and G are of a negative polarity will be referred to as the alternate half cycles.

During each first half cycle of the switching signals, junction 220, from which the reference signal may be taken, is connected to the non-inverting input circuit terminal 2 of operational amplifier 230 through the source and drain electrodes of field effect transistor 235 and resistor 245 and junction 240, from which the temperature condition signal may be taken, is connected to the inverting input circuit terminal 1 of operational amplifier 230 through the source and drain electrodes of field effect transistor 237 and resistor 246. Consequently, the reference and temperature condition signals are applied to the non-inverting and inverting input circuit terminals of operational amplifier 230, respectively, through respective resistors 245 and 246 during each first half cycle of the switching signals. During each alternate half cycle of the switching signal, junction 220 is connected to the inverting input circuit terminal 1 of operational amplifier 230 through the source and drain electrodes of field effect transistor 236 and resistor 246 and junction 240 is connected to the non-inverting input circuit terminal 2 of operational amplifier 230 through the source and drain electrodes of field effect transistor 238 and resistor 245. Consequently, the reference and temperature condition signals are applied ot the inverting and non-inverting input circuit terminals of operational amplifier 230, respectively, through respective resistors 246 and 245 during each alternate half cycle of the modulator switching signals.

With the reference signal of a magnitude greater than that of the temperature condition signal, during each first half cycle of the switching signals, the signal appearing at output circuit terminal 5 of operationalampliger 230 is of a positive polarity, as the greater magnitude positive polarity reference signal is applied to the non-inverting input circuit terminal during these half cycles, and during each alternate half cycle of the switching signals, the signal appearing at output circuit terminal 5 of operational amplifier 230 is of a negative polarity as the greater magnitude positive polarity reference signal is applied to the inverting input circuit terminal during these half cycles. Consequently, with the reference signal of a magnitude greater than that of the temperature condition signal, an alternating current temperature indicating signal of a frequency equal to the operational frequency of oscillator 189, FIG. 11, appears at output circuit terminal 5 of operational amplifier 230 and is of such a phase that the first half of each cycle is of a positive polarity and the second half of each cycle is of a negative polarity. This signal, substantially in phase with the switching signals, indicates an acceptable turbine temperature condition.

With the temperature condition signal of a magnitude greater than that of the reference signal, during each first half cycle of the switching signals, the signal appearing at output circuit terminal 5 of operational amplifier 230 is of a negative polarity as the greater magnitude positive polarity temperature condition signal is applied to the inverting input circuit terminal during these half cycles and during each alternate half cycle of the switching signals, the signal appearing at output circuit terminal 5 of operational amplifier 230 is of a positive polarity as the greater magnitude positive polarity temperature condition signal is applied to the noninverting input circuit terminal during these half cycles. Consequently, with the temperature condition signal of a magnitude greater than the reference signal, the alternating current temperature indicating signal appearing at output circuit terminal 5 of operational amplifier 230 is of such a phase that the first half of each cycle is of a negative polarity and the second half of each cycle is of a positive polarity. This signal, substantially 180° out of phase with the switching signals, indicates a turbine over-temperature condition and the amplitude of each half cycle is proportional to the degree of over-temperature.

The alternating current temperature indicating signal appearing at output circuit terminal 5 of operational amplifier 230 is applied across primary winding 302 of coupling transformer 300 through capacitor 265 which is inserted in the coupling circuit for the purpose of preventing any direct current potential components from appearing across primary winding 302. The fluctuating magnetic field produced by the resulting flow of alternating current through primary winding 302 induces a potential of the same frequency in secondary winding 303 in a manner well known in the art. Consequently, the temperature indicating signal also appears across secondary winding 303.

With the reference signal of a magnitude greater than that of the temperature condition signal, during each first half cycle of the temperature indicating signal appearing across secondary winding 303, terminals 308 and 309 thereof are of a positive and a negative polarity, respectively. As field effect transistor 261 of the de-modulator circuit is gate biased conductive by the first half cycles of the switching signals at this time, terminal 308 of secondary winding 303 is connected to and, consequently, the positive polarity signal which appears thereon is applied to inverting input circuit terminal 1 of operational amplifier 260 through resistor 306. During each second half cycle of the temperature condition signal appearing across secondary winding 303, terminals 308 and 309 thereof are of a negative and a positive polarity, respectively. As field effect transistor 262 of the de-modulator circuit is gate biased conductive by the alternate half cycles of the switching signals at this time, terminal 309 of secondary winding 303 is connected to and, consequently, the positive polarity signal appearing thereon is applied to inverting input circuit terminal 1 of operational amplifier 260 through resistor 306.

The positive polarity signal applied to inverting input circuit terminal 1 of operational amplifier 260 during both half cycles of the switching signals produces a negative polarity signal at output circuit terminal 5 thereof. Small input signals of positive polarity are capable of saturating amplifier 260 since the amplifier typically has gains exceeding 20,000 and no feedback is utilized in this mode of operation. This negative polarity output signal forward biases diode 310 to place the base electrode and the emitter electrode of type NPN amplifier transistor 312 at substantially the same potential which differs only to the extent of the voltage drop across diode 310. Consequently, type NPN transistor 312 is biased non-conductive under these conditions.

With the temperature condition signal of a magnitude greater than that of the reference signal, during the first half of each cycle of the temperature indicating signal appearing across secondary winding 303, terminals 308 and 309 thereof are of a negative and a positive polarity, respectively. As field effect transistor 261 of the de-modulator circuit is gate biased conductive by the first half cycles of the switching signals at this time, terminal 308 of secondary winding 303 is connected to and, consequently, the negative polarity signal appearing thereon is applied to inverting input circuit terminal 1 of operational amplifier 260 through resistor 306. During the second half of each of the temperature indicating signals appearing across secondary winding 303, terminals 308 and 309 thereof are of a positive and a negative polarity, respectively. As field effect transistor 262 of the de-modulator circuit is gate biased conductive by the alternate half cycles of the switching signals at this time, terminal 309 of secondary winding 303 is connected to and, consequently, the negative polarity signal appearing thereon is applied to inverting input circuit terminal 1 of operational amplifier 260 through resistor 306.

The negative polarity signal applied to the inverting input circuit terminal 1 of operational amplifier 260 during both half cycles of the switching signals produces a positive polarity signal at output circuit terminal 5 thereof. This positive polarity signal produces base-emitter current flow through type NPN transistor 312, causing this device to function as an emitter follower. The output voltage of amplifier 260 is determined by the relationship of the input voltage and its associated resistor 306 and the feedback elements, capacitor 263 and resistor 264. The relationship is $$E_{out} = \frac{E_{i} \cdot K_1(1+t_1 s)}{S}$$

where K is a constant approximately equal to the ratio of R264 divided by R306. The time constant $t$, is the product in seconds of capacitor 263 and resistor 264. $s$ is the operator used in LaPlace mathematical forms.

From this description, it is apparent that the circuitry schematically set forth in FIG. 10 detects differences in magnitude between the reference and temperature condition signals, produces respective alternating current temperature indicating signals which indicate which is of the greater magnitude and which are of an amplitude proportional to the degree of difference and is responsive to the temperature indicating signals which indicate that the temperature condition signal is of a magnitude greater than the reference signal to produce an over-temperature limit signal which continues to increase substantially linearly in magnitude at a rate proportional to the degree of over-temperatures so long as the over-temperature condition exists.

The power lever 28, FIG. 3, may be a conventional potentiometer having a movable contact 29 connected between the negative polarity line and a point of reference or ground potential through respective resistors 170 and 171. With this arrangement as shown in FIG. 3, the engine speed increases as movable contact 29 is adjusted in a direction toward the end of the potentiometer which is connected to the negative polarity line through resistor 170.

Associated with the power lever 28 is a compare circuit 48 which may be a convenional operational amplifier. The interconnections between terminals 1 through 5, inclusive, and 6 through 10, inclusive, of operational amplifier 48 are similar to the same interconnections described in detail in regard to operational amplifiers 100 and 101 and, consequently, will not be here described in detail. The balancing network is also similar to that previously described in regard to operational amplifiers 100 and 101 and includes the series combination of resistor 320, potentiometer 321 having a movable contact 322, and resistor 323 connected between the positive and negative polarity potential lines and the parallel combination of resistors 324 and 325 connected between respective opposite ends of potentiometer 321 and a point of reference or ground potential. Connected between the output circuit terminal 7 and the inverting input circuit terminal 2 is a feedback resistor 326.

The inverting input circuit terminal 2 of operational amplifier 48 is connected to a point of reference or ground potential through resistor 329, to the balance circuit through resistor 330, to the positive polarity engine speed signal ES through resistor 331 and to the movable contact 29 of the power lever potentiometer 28 through resistor 332.

The non-inverting input circuit terminal 5 of operational amplifier 48 is connected to a point of reference or ground potential through resistor 335, to the negative polarity fan speed limit signal FS through resistor 336, FIG. 6, and to the engine over temperature signal OT through resistor 337 and terminal OT2, FIG. 8, when the engine is operating on the power lever.

The signal taken off movable contact 29 of the power lever potentiometer 28 and the engine speed signal ES are the only variable signals applied to inverting input circuit terminal 2 of operational amplifier 48. Prior to starting the engine, movable contact 29 of power lever potentiometer 28 may be adjusted to substantially full power position by moving movable contact 29 in a direction toward that end of potentiometer 28 which is connected to the negative polarity line. At this setting, a negative polarity signal is applied to the inverting input circuit terminal 2 of operational amplifier 48, a condition which produces an output signal which is of a positive polarity with respect to ground at output circuit terminal 7 thereof. Under these conditions junction 338 is of a positive polarity which reverse biases diode 339, consequently, there is no power lever signal PL present upon the output terminal so labelled. As the engine increases in speed, however, the positive polarity engine speed signal ES, produced by the circuitry set forth in FIG. 5 in a manner previously explained, which is also applied to the inverting input circuit terminal 2 of operational amplifier 48 through resistor 331, increases in magnitude in a manner previously explained. Therefore, as the speed of the engine increases, the signal appearing at output circuit terminal 7 of operational amplifier 48 becomes less positive with respect to ground until the engine speed reaches a magnitude which is equal to that determined by the power lever setting. At this time, diode 340 becomes reverse biased and, consequently, blocks the signal present upon output circuit terminal 7. At this time, the potential of junction 338 becomes a negative polarity which forward biases diode 339 and a power lever signal PL appears across resistor 341. From this description, it is apparent that there is no power lever signal PL produced until the engine speed reaches a magnitude which is equal to that as determined by the power lever settings.

The fuel valve driver 46, which may be a conventional operational amplifier, and the associated circuitry is schematically set forth in FIG. 8.

As the interconnections between terminals 1 through 5, and 6 through 10 of operational amplifier 46 are similar to those described in regard to operational amplifiers 100 and 101, they will not be here described in detail. As with the other operational amplifier circuits, a balancing network is provided and is comprised of the series combination of resistor 345, potentiometer 346 having a movable contact 347 and resistor 348 connected across the positive and negative polarity potential lines in the parallel combination of resistors 349 and 350 connected between respective opposite ends of potentiometer 46 and a point of reference or ground potential.

The inverting input circuit terminal 2 of operational amplifier 46 is connected to the weight of fuel signal WF, produced by the circuitry of FIG. 4 previously described, through an adjusting potentiometer 351 and resistor 352, the power lever signal PL, produced by the circuitry of FIG. 3 previously described, through an adjusting potentiometer 353 and resistor 354, the fuel valve position indicator signal, produced by fuel valve position transducer 40, through resistor 355, the balance network signal through resistor 356 and to a point of reference or ground potential through resistor 357. Inverting input circuit terminal 2 is also connected to the movable contact 360 of potentiometer 359 through resistor 361. The non-inverting input circuit terminal 5 is connected to a point of reference or ground potential through a resistor 358. Connected across the negative polarity potential line and a point of reference or ground potential is the series combination of resistor 362 and potentiometer 359. By adjusting movable contact 360, fuel valve driver operational amplifier 46 may be biased to produce a minimum flow of fuel in the absence of all other input signals.

To direct the turbine over-temperature limit signal OT, produced by the circuitry of FIG. 11, previously described, to either the inverting input circuit terminal 2 of fuel valve driver operational amplifier 46 while the engine is accelerating in accordance with the computed acceleration schedule curve or to the non-inverting input circuit terminal 5 of operational amplifier 48 of the power lever circuit, FIG. 3, while the engine is accelerating in response to the power lever setting after it has reached the predetermined speed at which a power lever signal PL is produced, a discriminator circuit is provided which includes that circuitry within dashed rectangle 51 of FIG. 8 and comprises a type NPN transistor 365 and two type PNP transistors 366 and 367 and the associated circuitry. The negative polarity engine over-temperature signal OT is connected to a point of reference or ground potential through two series resistors 368 and 369. As the collector electrode of type NPN transistor 365 is connected to a point of reference or ground potential through collector resistor 370 and since the emitter electrode thereof is connected to the junction between series connected resistors 368 and 369, this device is forward poled only with the presence of a negative polarity turbine over-temperature limit signal OT. As the emitter electrodes of each of type PNP transistors 366 and 367 are connected to a point of reference or ground potential and the collector electrodes of each are connected to the junction between series connected resistors 368 and 369 through collector resistor 371 and the base-emitter junction of type NPN transistor 365 and through collector transistor 372, respectively, these devices are forward poled only with the presence of a turbine over-temperature limit signal OT. The base electrodes of each of type PNP transistors 366 and 367 are connected to the power lever signal PL through respective base resistors 373 and 374.

With the presence of a negative polarity turbine over-temperature limit signal OT which forward biases each of transistors 365, 366 and 367, in the absence of a negative polarity power lever signal PL, type PNP transistors 366 and 367 are base biased non-conductive, a condition which also base biases type NPN transistor 365 non-conductive. Under these conditions, therefore, the turbine over-temperature limit signal OT is applied to the inverting input circuit terminal 2 of fuel valve driver amplifier 46 through collector resistor 372 and resistor 375.

With the presence of a negative polarity turbine over-temperature limit signal OT which forward biases all of these transistors and a negative polarity power lever signal PL, emitter-base current flows through type PNP transistors 366 and 367, thereby triggering these forward poled devices conductive. With type PNP transistor 366 conducting, a circuit is completed for base-emitter current flow through type NPN transistor 365 to trigger this device conductive. With transistor 365 conducting, a negative polarity signal may be taken from junction 376 across collector resistor 370 and applied to the non-inverting input circuit terminal 2 of the power lever compare circuit operational amplifier 48 of FIG. 3 through resistor 337. Conducting transistor 367 substantially short circuits resistor 375, thereby assuring that the turbine over-temperature limit signal OT is not applied to the inverting input circuit terminal 2 of fuel valve driver of operational amplifier 46 while the engine is under the control of the power lever.

Of the signals applied to the inverting input circuit terminal 2 of fuel valve driver operational amplifier 46, the weight of fuel signal WF, the valve position indicator feedback signal, the power lever signal PL and the turbine over-temperature limit signal OT are variable. Upon startup, therefore, the only variable signal applied to the inverting input circuit terminal 2 of fuel valve driver operational amplifier 46 is the positive weight of fuel signal WF. The resulting negative polarity output signal appearing at output circuit terminal 7 thereof operates the fuel valve torque motor 39 to increase the flow of fuel to the engine in accordance with this curve. At the engine speed at which a power lever signal PL is produced, this negative polarity signal overcomes the weight of fuel signal WF, consequently, the fuel valve position is determined by the power lever signal PL from this point.

In the event there is a turbine over-temperature limit signal OT produced while the engine is accelerating under the influence of a computed acceleration schedule, this negative polarity signal applied to the inverting input circuit terminal 2 of fuel valve driver operational amplifier 46 results in a less negative output signal of output terminal 7 thereof, a condition which tends to reduce the amount of engine fuel flow.

With the engine operating on the power lever signal PL, the negative polarity turbine over-temperature limit signal OT is applied to the non-inverting circuit terminal 5 of the power lever circuit operational amplifier 48 of FIG. 3, a condition which tends to make the signal present upon the output circuit terminal thereof more negative. A more negative output signal increases the magnitude of the negative polarity power lever signal PL, and, therefore, has the effect of reducing the power lever setting as sensed by fuel valve driver operational amplifier 46, a condition which tends to also reduce the amount of engine fuel flow as this more negative power lever signal PL produces a more positive polarity output signal at output terminal 7 of fuel valve driver operational amplifier 46.

A negative polarity fan limit signal FS, which is also applied to the non-inverting input circuit terminal 5 of the power lever circuit operational amplifier 48 operates in an identical manner to that of the negative polarity turbine over-temperature limit signal to reduce the amount of fuel flow to the engine.

The output signal of the fuel valve driver operational amplifier 46 may be amplified by a conventional power amplifier comprising transistors 378, 379, 380 and 381 and the associated circuitry. As this power lever amplifier circuit is conventional in design and well known in the art, it will not be herein described in detail.

The starting sequence switches of FIG. 9 are included to demonstrate the capability of operating one or more relays at successively higher engine speeds. Upon the closure of a starter switch, not shown, a potential is placed upon line 382. Consequently, a potential is placed upon the bleed valve, not shown through the normally closed contacts 383 of relay 384 and to the starter valve, not shown, through the normally closed contacts 386 of relay 387.

Connected across a positive polarity potential line and a negative polarity potential line are the collector-emitter electrodes of each of three type NPN transistor pairs 389, 390 and 391. Of these transistor pairs, the left electrodes are normally conductive and the right electrodes are normally not conductive. As the positive polarity engine speed signal ES increases in magnitude, the right electrodes of transistor pair 389 are base biased conductive, thereby completing a circuit for energizing the operating coil of relay 394 thereby closing its contact to supply a polarity potential to the fuel valve, not shown.

As the engine continues to increase in speed, the right electrodes of transistor pair 390 are biased conductive, thereby completing an energizing circuit for the operating coil of relay 387 to remove the potential from the starter valve.

As the engine continues to increase in speed, the right electrodes of transistor pair 391 are triggered conductive thereby completing an energizing circuit for the operating coil of relay 384 to remove the potential from the bleed valve. The transistor pairs 389, 390 and 391 may be arranged to become conductive at these successive times by varying the movable contacts of respective potentiometers 398, 399 and 400.

While specific electrical devices and electrical polarities have been set forth in this specification, it is to be specifically understood that alternate devices and compatible electrical polarities may be employed without departing from the spirit of the invention.

While a preferred embodiment of the present invention has been shown and described it will be obvious to those skilled in the art that various modifications and substitutions may be made without departing from the spirit of the invention which is to be limited only wihin the scope of the appended claims.

What is claimed is:

1. A proportional and integral signal amplifier circuit for producing an electrical indicating signal which indicates a selected condition and an output potential signal which is proportional to and an integral of the indicating signal comprising in combination with means for providing a direct current condition signal and a separate direct current reference signal, a power supply which provides direct current operating potentials and alternating current switching signals, a first operational amplifier having at least inverting and non-inverting input circuit terminals and an output circuit terminal for producing an alternating current electrical indicating signal of one phase when said condition signal is of a magnitude less than said reference signal and of the opposite phase when said condition signal is of a magnitude greater than said reference signal and of a magnitude proportional to the degree of difference, a modulator circuit responsive to said alternating current switching signals for connecting said reference signal and said condition signal to a respective input circuit terminal of said first operational amplifier and to simultaneously switch each of said signals to the opposite input circuit terminal of said first operational amplifier at a frequency determined by the frequency of said alternating current switching signals, a second operational amplifier having at least inverting and non-inverting input circuit terminals and an output circuit terminal for producing an output potential signal which is proportional to and an integral of said indicating signal, a coupling transformer having a primary winding and a secondary winding, circuit means for applying said indicating signal across said primary winding and a de-modulator circuit responsive to said alternating current switching signals for alternately connecting opposite ends of said secondary winding to said inverting input terminal of said second operational amplifier at a frequency determined by the frequency of said alternating current switching signals.

2. A proportional and integral signal amplifier circuit for producing an electrical indicating signal which indicates a selected condition and an output potential signal which is proportional to and an integral of the indicating signal comprising in combination with a means for providing a direct current condition signal and a separate direct current reference signal, a power supply which provides direct current operating potentials and alternating current switching signals, a first operational amplifier having at least inverting and non-inverting input circuit terminals and an output circuit terminal for producing an alternating current electrical indicating signal of one phase when said condition signal is of a magnitude less than said reference signal and of the opposite phase when said condition signal is of a magnitude greater than said reference signal and of a magnitude proportional to the degree of difference, first, second, third and fourth field effect transistors each having a source, a drain and a gate electrode, means for connecting said source electrodes of said first and second field effect transistors to said means for providing a separate direct current reference signal, means for connecting said source electrodes of said third and fourth field effect transistors to said means for providing a direct current condition signal, means for connecting said drain electrodes of said first and fourth field effect transistors to said non-inverting input circuit terminal of said first operational amplifier, means for connecting said drain electrodes and said second and third field effect transistors to said inverting input circuit terminal of said first operational amplifier, means for applying said alternating current switching signals to the said gate electrodes of said first and third field effect transistors and, in an opposite phase relationship, to the said gate electrodes of said second and fourth field effect transistors, a second operational amplifier having at least inverting and non-inverting input circuit terminals and an output circuit terminal for producing an output potential signal which is proportional to and an integral of said indicating signal, a coupling transformer having a primary winding and a secondary winding, circuit means for applying said indicating signal across said primary winding, fifth and sixth field effect transistors each having a source electrode, a drain electrode and a gate electrode, means for connecting the said source electrode of each of said fifth and sixth field effect transistors to a respective opposite end of said secondary winding, means for connecting the said drain electrodes of said fifth and sixth field effect transistor devices to the said inverting input circuit terminal of said second operational amplifier and means for applying said alternating current switching signals to the said gate electrodes of each of said fifth and sixth field effect transistor devices in an opposite phase relationship.

References Cited

UNITED STATES PATENTS 3,283,579  11/1966  Josephs _____ 307—310

STANLEY D. MILLER, Primary Examiner

D. M. CARTER, Assistant Examiner

U.S. Cl. X.R.

307—310; 328—3